June 24, 1930.  S. FREEMAN  1,766,990
LIPSTICK
Filed April 24, 1929

INVENTOR
BY
ATTORNEYS

Patented June 24, 1930

1,766,990

UNITED STATES PATENT OFFICE

SAMUEL FREEMAN, OF NEW YORK, N. Y.

LIP STICK

Application filed April 24, 1929. Serial No. 357,639.

This invention relates to improvements in lipstick containers. Its particular object is to provide a mirror in combination with the cover of a lipstick container.

A particular object of this invention is to provide a mirror integral with the cover of the lipstick container so that said mirror will be normally a part of the lipstick container. However, when the cover is detached from the lipstick container, it can be held in one hand while the lipstick is being used.

Further objects of the invention will be apparent from the specification and drawings in which—

Figure 1:
Fig. 1 shows a perspective view of an ordinary lipstick container with a detachable cover.
Figure 2:
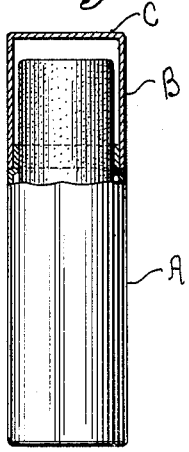
Fig. 2 is a vertical section showing the cover, lipstick and the container, the end of the cover having the normal flat shape.
Figure 3:
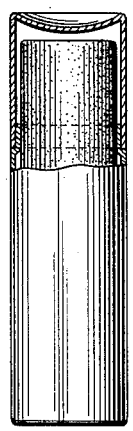
Fig. 3 is a vertical sectional view of the lipstick container and cover showing the end of the cover made concave and fashioned into a mirror.
Figure 4:
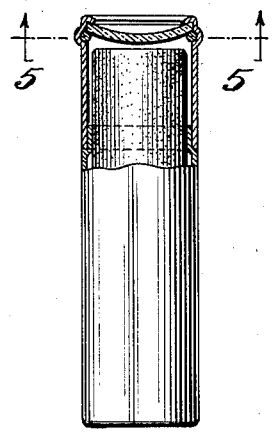
Fig. 4 is a view similar to Fig. 3 in which a glass mirror is substituted for the metal mirror formed in Fig. 3 by the arcuate shape of the end of the metal cover.
Figure 5:
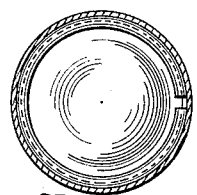
Fig. 5 is a sectional view along the line 5—5 of Fig. 4.
Figure 6:
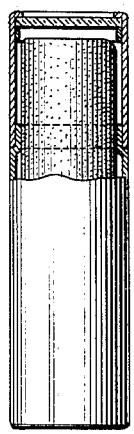
Fig. 6 shows a vertical sectional view of my improved lipstick container provided with a flat inserted mirror.
Figure 7:
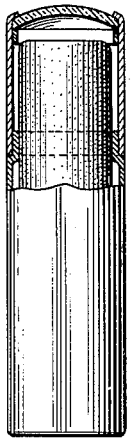
Fig. 7 shows a rounded mirror and Fig. 8 shows an enlarger planar mirror.
Figure 8:
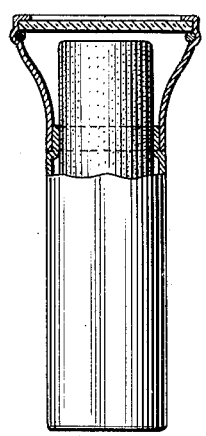
Figure 9:
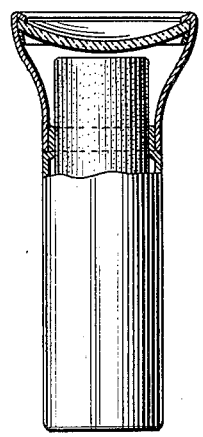
Fig. 9 shows a vertical sectional view with an enlarged concave mirror.

A represents the body of the usual lipstick container, and B represents a detachable cover. In the embodiment shown in Fig. 2 I form the outer end of the cover C into a mirror by polishing the same. Fig. 3 shows the same type mirror formed with a concave surface. In Fig. 4, I show an embodiment in which a glass concave mirror is inserted into the end of the cover. In Fig. 6 I show an embodiment in which a flat mirror is inserted in this outer end and in Fig. 7 I show the use of a convex mirror. It is to be understood that my invention generally covers the use of a mirror of convex or concave or flat shape, as all types are illustrated herein. In Fig. 8, I show an embodiment in which an enlarged planar glass mirror is inserted into the end of the cover, Fig. 9 is a modification in which an enlarged mirror of a concave form is provided.

It will be apparent that the cover, being detachable, may be held in the left hand to serve as a mirror, while the lipstick container may be manipulated by the right hand of the user. In this way, the user is provided at all times with a mirror which is sufficiently large to guide the use of the lipstick without substantially increasing the size of the container.

It will be noted that in the embodiment shown in Fig. 3 for example, the end of the cover B is shaped to act as a magnifying mirror. This is the preferred embodiment of my invention because the elimination of a glass mirror produces a very substantial economy in the manufacture of the device. Likewise, since lipstick containers and their covers are made of small diameter, an efficient mirror is best secured by forming the outer end of the cover B of concave shape, so that it acts as a magnifying mirror.

Having fully described my invention, what I claim is:

1. In combination, a lipstick container in which a lipstick snugly fits, said container having a metal cover whose outer end surface is polished to act as a mirror.

2. In combination, a lipstick container in which a lipstick snuggly fits, said container having a metal cover, the outer end surface of said cover being provided with a magnifying mirror.

3. In combination, a lipstick container in which a lipstick snuggly fits, said container having a metal cover whose outer end surface is shaped to act as a magnifying mirror.

In testimony whereof I affix my signature.

SAMUEL FREEMAN.